United States Patent
Huang et al.

(10) Patent No.: US 10,797,500 B2
(45) Date of Patent: Oct. 6, 2020

(54) CHARGER CIRCUIT AND CAPACITIVE POWER CONVERSION CIRCUIT AND CHARGING CONTROL METHOD THEREOF

(71) Applicant: RICHTEK TECHNOLOGY CORPORATION, Zhubei, HsinChu (TW)

(72) Inventors: Tsung-Wei Huang, HsinChu (TW); Shun-Yu Huang, HsinChu (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 594 days.

(21) Appl. No.: 15/639,732

(22) Filed: Jun. 30, 2017

(65) Prior Publication Data

US 2018/0083458 A1     Mar. 22, 2018

Related U.S. Application Data

(60) Provisional application No. 62/396,897, filed on Sep. 20, 2016, provisional application No. 62/406,724, filed on Oct. 11, 2016.

(30) Foreign Application Priority Data

Apr. 19, 2017     (CN) .......................... 2017 1 0256910

(51) Int. Cl.
*H02J 7/00* (2006.01)
*H02J 7/34* (2006.01)
(Continued)

(52) U.S. Cl.
CPC ............ *H02J 7/007* (2013.01); *H02J 7/0024* (2013.01); *H02J 7/0045* (2013.01); *H02J 7/345* (2013.01);
(Continued)

(58) Field of Classification Search
CPC ........ H02J 7/007; H02J 7/0024; H02J 7/0045; H02J 7/345; H02M 3/07; H02M 3/06
(Continued)

(56) References Cited

U.S. PATENT DOCUMENTS 4,621,315 A * 11/1986 Vaughn .................... H02M 3/07
                                                                363/59
5,982,604 A * 11/1999 Kojima ................. H02J 7/0065
                                                                323/282
(Continued)

*Primary Examiner* — John T Trischler
(74) *Attorney, Agent, or Firm* — Tung & Associates

(57) ABSTRACT

A charger circuit for providing a charging current and voltage to a battery includes a power delivery unit and a capacitive power conversion circuit. The power delivery unit converts an input power to a DC voltage and current. The capacitive power conversion circuit includes a conversion switch circuit including plural conversion switches and being coupled with one or plural conversion capacitors, a regulation switch, and a conversion control circuit. In a current scaled-up charging mode, the DC current is regulated, and the conversion control circuit controls the connection of the plural conversion capacitors such that the charging current is scaled-up of the DC current substantially by a predetermined current scale-up factor. In a constant voltage linear charging mode, the conversion control circuit linearly controls the regulation switch to regulate the level of the charging voltage to a predetermined constant voltage level.

10 Claims, 4 Drawing Sheets

(51) Int. Cl.
*H02M 3/06* (2006.01)
*H02M 3/07* (2006.01)

(52) U.S. Cl.
CPC .............. *H02M 3/06* (2013.01); *H02M 3/07* (2013.01); *H02J 7/342* (2020.01)

(58) Field of Classification Search
USPC ........................................................ 320/162
See application file for complete search history.

(56) References Cited

U.S. PATENT DOCUMENTS

| | | | | |
|---|---|---|---|---|
| 6,169,669 B1* | 1/2001 | Choudhury | ............. | H02J 9/062 307/66 |
| 6,310,789 B1* | 10/2001 | Nebrigic | ............. | H02M 3/1588 363/60 |
| 6,657,876 B2* | 12/2003 | Satoh | ............. | H02J 7/0065 307/110 |
| 6,710,666 B1* | 3/2004 | Wu | ............. | H03L 7/0893 327/148 |
| 6,812,778 B1* | 11/2004 | Yeo | ............. | G05F 3/267 327/382 |
| 7,161,436 B2* | 1/2007 | Hsu | ............. | H03L 7/0893 327/141 |
| 7,170,763 B2* | 1/2007 | Pai | ............. | H02M 3/33507 320/140 |
| 7,271,633 B2* | 9/2007 | Hsu | ............. | H03L 7/0893 327/148 |
| 7,474,141 B2* | 1/2009 | Huang | ............. | H02M 3/07 327/536 |
| 7,518,432 B2* | 4/2009 | Lin | ............. | H02M 3/07 327/536 |
| 7,619,394 B2* | 11/2009 | Pai | ............. | H05B 41/32 320/134 |
| 7,626,427 B2* | 12/2009 | Gruber | ............. | H03K 5/2472 327/81 |
| 7,667,530 B2* | 2/2010 | Chu | ............. | H02M 3/07 327/306 |
| 7,888,989 B2* | 2/2011 | Lin | ............. | H02M 3/07 327/535 |
| 8,098,089 B2* | 1/2012 | Bitonti | ............. | H02M 3/07 327/534 |
| 8,134,106 B2* | 3/2012 | Tamegai | ............. | G01J 1/46 250/205 |
| 8,242,833 B2* | 8/2012 | Lin | ............. | H02M 3/07 327/535 |
| 8,294,447 B2* | 10/2012 | Xie | ............. | H02M 3/156 323/299 |
| 8,310,299 B2* | 11/2012 | Lin | ............. | H02M 3/07 327/535 |
| 8,358,168 B2* | 1/2013 | Lin | ............. | H02M 3/07 327/535 |
| 8,362,823 B2* | 1/2013 | Lin | ............. | H02M 3/07 327/535 |
| 8,823,283 B2* | 9/2014 | Kesterson | ............. | H05B 37/02 315/186 |
| 9,000,716 B2* | 4/2015 | Kanbayashi | ............. | B60K 6/48 320/104 |
| 9,123,402 B2* | 9/2015 | Pyeon | ............. | G11C 5/145 |
| 9,190,900 B2* | 11/2015 | Carletti | ............. | H02M 1/4225 |
| 9,450,436 B2* | 9/2016 | Carletti | ............. | H02M 1/4225 |
| 9,507,357 B2* | 11/2016 | Weis | ............. | G05F 1/573 |
| 9,641,085 B2* | 5/2017 | Li | ............. | H02M 3/33507 |
| 9,876,460 B2* | 1/2018 | Yamamoto | ............. | B60K 6/445 |
| 10,177,420 B2* | 1/2019 | Huang | ............. | H01M 10/443 |
| 10,177,576 B2* | 1/2019 | Huang | ............. | H02J 7/0008 |
| 10,177,588 B2* | 1/2019 | Huang | ............. | H02J 7/007 |
| 10,181,744 B2* | 1/2019 | Huang | ............. | H02J 7/0054 |
| 10,220,636 B2* | 3/2019 | Endo | ............. | H01S 5/06209 |
| 10,411,581 B1* | 9/2019 | Huang | ............. | H02M 3/158 |
| 10,523,032 B2* | 12/2019 | Huang | ............. | H02J 7/0055 |
| 2003/0007373 A1* | 1/2003 | Satoh | ............. | H02J 7/0065 363/60 |
| 2004/0101081 A1* | 5/2004 | Hsu | ............. | H03L 7/0893 375/376 |
| 2007/0090863 A1* | 4/2007 | Hsu | ............. | H03L 7/0893 327/157 |
| 2008/0024198 A1* | 1/2008 | Bitonti | ............. | H02M 3/07 327/536 |
| 2008/0197898 A1* | 8/2008 | Lin | ............. | H02M 3/07 327/157 |
| 2009/0219078 A1* | 9/2009 | Chu | ............. | H02M 3/07 327/536 |
| 2009/0242734 A1* | 10/2009 | Tamegai | ............. | G01J 1/46 250/206 |
| 2010/0156514 A1* | 6/2010 | Lin | ............. | H02M 3/07 327/536 |
| 2010/0156515 A1* | 6/2010 | Lin | ............. | H02M 3/07 327/536 |
| 2010/0156516 A1* | 6/2010 | Lin | ............. | H02M 3/07 327/536 |
| 2010/0156517 A1* | 6/2010 | Lin | ............. | H02M 3/07 327/536 |
| 2011/0273141 A1* | 11/2011 | Kanbayashi | ............. | B60K 6/48 320/134 |
| 2013/0241427 A1* | 9/2013 | Kesterson | ............. | H05B 37/02 315/210 |
| 2014/0103861 A1* | 4/2014 | Carletti | ............. | H02M 1/4225 320/107 |
| 2015/0137774 A1* | 5/2015 | Weis | ............. | G05F 1/573 323/234 |
| 2015/0244276 A1* | 8/2015 | Li | ............. | H02M 3/33507 363/21.17 |
| 2016/0043588 A1* | 2/2016 | Carletti | ............. | H02M 1/4225 320/107 |
| 2017/0257052 A1* | 9/2017 | Yamamoto | ............. | B60K 6/445 |
| 2017/0341413 A1* | 11/2017 | Endo | ............. | H01S 5/06209 |
| 2018/0083456 A1* | 3/2018 | Huang | ............. | H02J 7/007 |
| 2018/0083457 A1* | 3/2018 | Huang | ............. | H02J 7/0054 |
| 2018/0083459 A1* | 3/2018 | Huang | ............. | H02J 7/0008 |
| 2018/0375362 A1* | 12/2018 | Huang | ............. | H02J 7/0072 |
| 2019/0252896 A1* | 8/2019 | Huang | ............. | H02M 3/158 |
| 2019/0273428 A1* | 9/2019 | Huang | ............. | H03K 7/08 |

\* cited by examiner

20: USB or USBPD specification compliant cable and/or connector

In the current scale-up mode:
ICHG=K*IDC

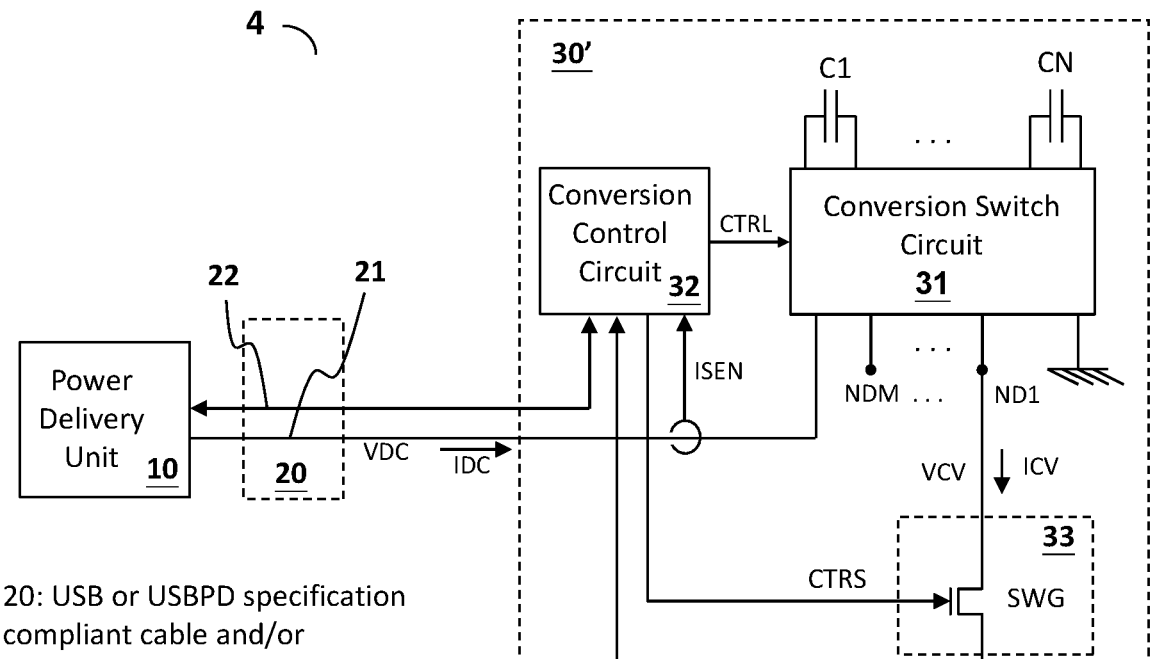

20: USB or USBPD specification compliant cable and/or connector

In the current scale-up mode:
ICHG=K*IDC

In the constant voltage linear charging mode:
the charging voltage VCHG is regulated at a predetermined constant voltage level In the constant current linear charging mode:
the charging current ICHG is regulated at a predetermined constant current level In the constant voltage linear charging mode or the constant current linear charging mode:
VCV − VCHG < predetermined dropout voltage

CHARGER CIRCUIT AND CAPACITIVE POWER CONVERSION CIRCUIT AND CHARGING CONTROL METHOD THEREOF

CROSS REFERENCE

The present invention claims priority to U.S. 62/396,897, filed on Sep. 20, 2016; U.S. 62/406,724, filed on Oct. 11, 2016; and CN 201710256910.X, filed on Apr. 19, 2017.

BACKGROUND OF THE INVENTION

Field of Invention

The present invention relates to a charger circuit; particularly, it relates to a charger circuit which can scale up a charging current and perform a constant voltage charging. The present invention also relates to a capacitive power conversion circuit and a charging control method for use in the charger circuit.

Description of Related Art

FIG. 1 shows a prior art charger circuit (charger circuit 1) which comprises an adaptor 11 capable of directly charging a battery 50. The adaptor 11 can provide a DC current IDC through a cable 20 (for example a USB cable) and a load switch 40 to the battery 50 to charge the battery 50 by a constant current, wherein the DC current IDC and the charging current ICHG are substantially the same. However, when using a USB standard cable, the maximum current is limited by the cable current rating, which is 5 A or lower, and therefore a longer charging time is required. If it is desired to raise the charging current, for example to 8 A or higher to expedite the charging time, a specially-designed fast charging cable with a larger diameter is required. However, it is inconvenient to use the fast charging cable, because first, it is a non-standard cable, and second, the fast charging cable is less flexible for accommodation due to its larger diameter.

FIG. 2 shows another prior art charger circuit (charger circuit 2) which includes a switching charger circuit 60 which converts the power provided by the adaptor 11 (for example but not limited to 5V, 9V, or 12V VBUS compliant with USB PD specification) to a charging current ICHG to charge the battery 50 by a constant current. In this prior art, the charging current ICHG may be larger than the DC current IDC. A drawback of the prior art circuit in FIG. 2 is that it is very difficult to optimize the choices of the specifications of the inductor and switches (both not shown) of the switching conversion circuit 60 so that critical parameters such as the charging current, current ripple amplitude, conduction resistance of the switch, power conversion efficiency and etc. can be optimized.

Compared to the prior art in FIG. 1, the present invention is advantageous in providing a scale-up charging current for charging a battery to shorten the charging time, while a standard cable such as a USB compliant cable can be used, through which only a relatively lower current is allowed. Compared to the prior art in FIG. 2, the present invention is advantageous in not requiring an inductor, having a smaller size, lower cost, and easier optimization for component selections to maximize power conversion efficiency.

SUMMARY OF THE INVENTION

From one perspective, the present invention provides a charger circuit, configured to operably convert a DC power to a charging power for charging a battery, wherein the DC power includes a DC voltage and a DC current, and the charging power includes a charging voltage and a charging current; the charger circuit comprising: a power delivery unit, configured to operably convert an input power to the DC power; and a capacitive power conversion circuit which includes: a conversion switch circuit including plural conversion switches coupled to one or more conversion capacitors, the conversion switch circuit being configured to operably convert the DC power to a converted output power, wherein the converted output power includes a converted output voltage and a converted output current; a linear regulation switch circuit including a regulation switch coupled to the conversion switch circuit, the linear regulation switch circuit being configured to operably convert the converted output power to the charging power, wherein an input terminal and an output terminal of the regulation switch are electrically connected to the converted output power and the charging power respectively; and a conversion control circuit, configured to operably generate a conversion switch control signal for controlling the plural conversion switches and a regulation switch control signal for controlling the regulation switch; wherein in a current scale-up charging mode, the power delivery unit regulates the DC current, and the conversion switch control signal operates the plural conversion switches so as to electrically connect the one or more conversion capacitors between a pair of nodes selected from one or more charging voltage division nodes, the DC output voltage, and a ground node periodically during plural charging conversion time periods, such that the charging current is scaled-up of the DC current substantially by a predetermined current scale-up factor, wherein the converted output power is electrically connected to one of the one or more voltage division nodes, and the regulation switch control signal conducts the regulation switch such that the converted output current becomes the charging current; in a constant voltage linear charging mode, the regulation switch control signal operates the regulation switch, such that the charging voltage is regulated at a predetermined constant voltage level; and in a constant current linear charging mode, the regulation switch control signal operates the regulation switch, such that the charging current is regulated at a predetermined constant current level.

In one embodiment, in the constant voltage linear charging mode or the constant current linear charging mode, the power delivery unit determines the DC voltage according to a charging voltage related signal, such that the DC voltage level is close to but larger than the charging voltage, whereby a voltage difference between the input terminal and the output terminal of the regulation switch is smaller than a predetermined dropout voltage.

In one embodiment, the charger circuit further comprises a cable coupled between the power delivery unit and the capacitive power conversion circuit, wherein the cable is a USB or USB PD (Universal Serial Bus Power Delivery) specification compliant cable which includes a power line for transmitting the DC output power and a signal line for transmitting the charging voltage related signal.

In one embodiment, the conversion capacitors include a first and a second conversion capacitors, and the plural charging conversion time periods includes a first and a second charging conversion time periods; wherein in the current scale-up charging mode, the conversion control circuit operates the conversion switches so as to electrically connect a first node of the first conversion capacitor to the DC voltage and the converted output voltage during the first and the second charging conversion time periods respectively, and electrically connect a second node of the first conversion capacitor to the converted output voltage and the ground node during the first and the second charging conversion time periods respectively, and electrically connect a first node of the second conversion capacitor to the DC voltage and the converted output voltage during the second and the first charging conversion time periods respectively, and electrically connect a second node of the second conversion capacitor to the converted output voltage and the ground node during the second and the first charging conversion time periods respectively, such that the charging current is substantially 2 times the DC current.

From another perspective, the present invention provides a capacitive power conversion circuit for use in a charger circuit which is configured to operably convert a DC power to a charging power for charging a battery, wherein the DC power includes a DC voltage and a DC current, and the charging power includes a charging voltage and a charging current; wherein the charger circuit includes a power delivery unit configured to operably convert an input power to the DC power; the capacitive power conversion circuit comprising: a conversion switch circuit including plural conversion switches coupled to one or more conversion capacitors, the conversion switch circuit being configured to operably convert the DC power to a converted output power, wherein the converted output power includes a converted output voltage and a converted output current; a linear regulation switch circuit including a regulation switch coupled to the conversion switch circuit, the linear regulation switch circuit being configured to operably convert the converted output power to the charging power, wherein an input terminal and an output terminal of the regulation switch are electrically connected to the converted output power and the charging power respectively; and a conversion control circuit, configured to operably generate a conversion switch control signal for controlling the plural conversion switches and a regulation switch control signal for controlling the regulation switch; wherein in a current scale-up charging mode, the power delivery unit regulates the DC current, and the conversion switch control signal operates the plural conversion switches so as to electrically connect the one or more conversion capacitors between a pair of nodes selected from one or more charging voltage division nodes, the DC output voltage, and a ground node periodically during plural charging conversion time periods, such that the charging current is scaled-up of the DC current substantially by a predetermined current scale-up factor, wherein the converted output power is electrically connected to one of the one or more voltage division nodes, the regulation switch control signal controls the regulation switch to be conductive for conducting the converted output current to be the charging current; in a constant voltage linear charging mode, the regulation switch control signal operates the regulation switch, such that the charging voltage is regulated at a predetermined constant voltage level; and in a constant current linear charging mode, the regulation switch control signal operates the regulation switch, such that the charging current is regulated at a predetermined constant current level.

From another perspective, the present invention provides a charging control method for use in a charger circuit which is configured to operably convert a DC power to a charging power for charging a battery, wherein the DC power includes a DC voltage and a DC current, and the charging power includes a charging voltage and a charging current; wherein the charger circuit comprises: a power delivery unit, configured to convert an input power to the DC power; and a capacitive power conversion circuit which includes: a conversion switch circuit including plural conversion switches coupled to one or more conversion capacitors, the conversion switch circuit being configured to operably convert the DC power to a converted output power, wherein the converted output power includes a converted output voltage and a converted output current; and a linear regulation switch circuit including a regulation switch coupled to the conversion switch circuit, the linear regulation switch circuit being configured to operably convert the converted output power to the charging power, wherein an input terminal and an output terminal of the regulation switch are electrically connected to the converted output power and the charging power respectively; the charging control method comprising: operating the charger circuit in a current scale-up charging mode, a constant voltage linear charging mode, and a constant current linear charging mode, wherein: in the current scale-up charging mode: regulating the DC current; during plural charging conversion time periods, operating the plural conversion switches so as to electrically connect the one or more conversion capacitors between a pair of nodes selected from one or more charging voltage division nodes, the DC output voltage, and a ground node periodically such that the charging current is scaled-up of the DC current substantially by a predetermined current scale-up factor, wherein the converted output power is electrically connected to one of the one or more voltage division nodes; and conducting the regulation switch such that the converted output current becomes the charging current; in the constant voltage linear charging mode: operating the regulation switch, such that the charging voltage is regulated at a predetermined constant voltage level; and in the constant current linear charging mode: operating the regulation switch, such that the charging current is regulated at a predetermined constant current level.

In one embodiment, charging control method further comprises: in the constant voltage linear charging mode or the constant current linear charging mode: adjusting the DC voltage by the power delivery unit according to a battery voltage related signal such that the DC voltage level is close to but larger than the battery voltage, whereby a voltage difference between the input terminal and the output terminal of the regulation switch is smaller than a predetermined dropout voltage.

The objectives, technical details, features, and effects of the present invention will be better understood with regard to the detailed description of the embodiments below.

BRIEF DESCRIPTION OF THE DRAWINGS

FIG. 4 shows a schematic diagram of an embodiment of the charger circuit according to the present invention.

DESCRIPTION OF THE PREFERRED EMBODIMENTS

The drawings as referred to throughout the description of the present invention are for illustration only, to show the interrelations between the circuits and the signal waveforms, but not drawn according to actual scale.

Figure 1:
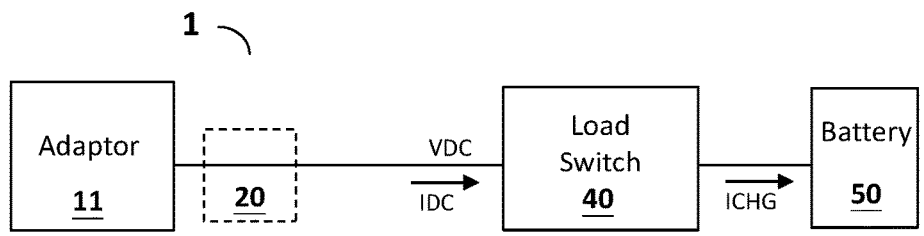
FIG. 1 shows a schematic diagram of a prior art charger circuit.
Figure 2:
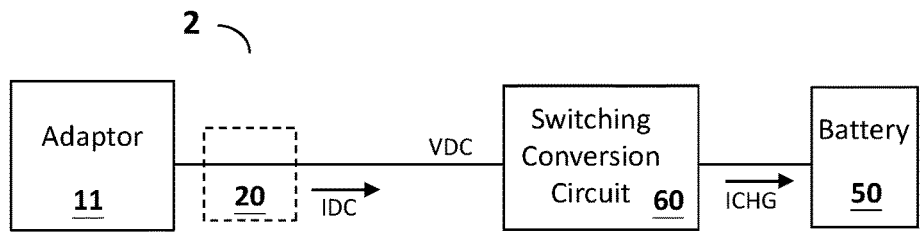
FIG. 2 shows schematic diagrams of a prior art charger circuit.
Figure 3:
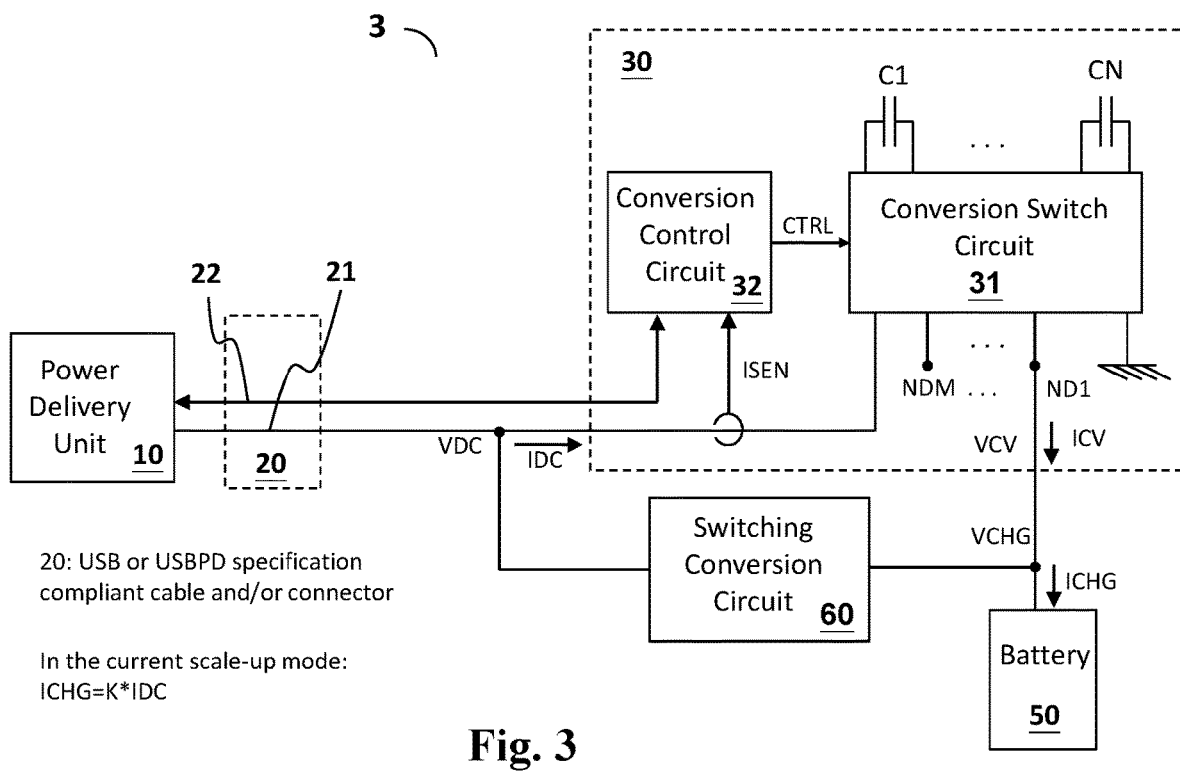
FIG. 3 shows a schematic diagram of an embodiment of the charger circuit according to the present invention.

FIG. 3 shows one embodiment of the charger circuit according to the present invention (charger circuit 3). As shown in the figure, the charger circuit 3 is configured to operably convert a DC power to a charging power for charging a battery 50, wherein the DC power includes a DC voltage VDC and a DC current IDC, and the charging power includes a charging voltage VCHG and a charging current ICHG. The charger circuit 3 comprises a power delivery unit 10 and a capacitive power conversion circuit 30. The power delivery unit 10 converts an input power to the DC power. The power delivery unit 10 may be for example a power adaptor which converts the input power in AC form to the aforementioned DC power, or may be a DC-DC conversion circuit which converts the input power providing from for example a power bank to the aforementioned DC power. The capacitive power conversion circuit 30 includes: a conversion switch circuit 31 for converting the DC power to a converted output power, wherein the converted output power includes a converted output voltage VCV and a converted output current ICV. The conversion switch circuit 31 includes plural conversion switches (to be shown in FIG. 5 as an example), coupled to one or more conversion capacitors (for example C1 or C1-CN shown in FIG. 3); and a conversion control circuit 32, configured to operably generate a switch control signal CTRL to control the plural conversion switches. In this embodiment, the charging power and the converted output power is directly coupled, and therefore the converted output current is substantially the same as the charging current ICHG.

In one embodiment, the power delivery unit 10 can support a constant current direct charging mode in which the power delivery unit 10 can directly charge the battery 50 bypassing the control of the capacitive power conversion circuit 30 (related circuitry not shown).

In one embodiment, in a current scale-up charging mode, the power delivery unit 10 regulates the DC current IDC, and during plural charging conversion time periods, the switch control signal CTRL operates the plural conversion switches so as to electrically connect the one or more conversion capacitors (C1 or C1-CN) between a pair of nodes selected from one or more charging voltage division nodes (corresponding to for example ND1 or ND1-NDM, wherein M is a natural number), the DC voltage VDC, and a ground node periodically, such that the charging current ICHG is scaled-up substantially by a predetermined current scale-up factor K, i.e., ICHG is K times IDC. In one preferred embodiment, K is a real number larger than 1, in other words, the charging current ICHG is larger than the DC current IDC. Therefore, with the same level of the DC current IDC, the charger circuit of the present invention can charge the battery 50 with a relatively larger charging current ICHG to reduce the charging time. Note that the charging power is electrically connected to one of the charging voltage division nodes (for example ND1 shown in FIG. 3) to generate the charging current ICHG through the node. In one embodiment, the capacitive power conversion circuit 30 may include for example but not limited to a divider charge pump.

Note that the term "predetermined" may be a fixed value, or an adjustable variable, throughout the text. Also note that although it is intended to regulate the charging current ICHG substantially at a level which is the predetermined current scale-up factor K times the DC current IDC, however due to non-idealities caused by for example imperfect manufacture of components or imperfect matching among components, the actual level of the charging current ICHG may not be exactly equal to K times IDC, but just close to K times, and so the term "substantially" is used to express that there can be a reasonable range of tolerance, the same hereinafter when using "substantially" in other occasions. Also note that in one embodiment with only one voltage division node, the factor K is 2, that is, the charging current ICHG is substantially 2 times IDC. In other embodiments with plural voltage division nodes, the factor K varies depending on which node the charging power is electrically connected to, and K is not limited to being an integer.

Also note that it is not necessarily required for the power delivery unit 10 to regulate the DC current IDC. In one embodiment, the power delivery unit 10 can alternatively regulate the DC voltage VDC. Under this circumstance, the capacitive power conversion circuit 30 can operate to regulate the charging voltage VCHG at a level which is substantially a predetermined voltage scaling factor K' times the DC voltage VDC. In one preferred embodiment, K' is less than 1 for achieving capacitive voltage step-down power conversion.

In general, a complete charging cycle includes pre-charging, constant current charging and constant voltage charging phases. The capacitive power conversion circuit of the aforementioned embodiment is mainly used in for example but not limited to the constant current charging phase which requires larger current. Still referring to FIG. 3, in one embodiment, the charger circuit of the present invention may further include a switching conversion circuit 60 which includes at least an inductor, and is for use in converting the DC power to the charging power to pre-charge the battery 50 (for example by a relative smaller constant current) or to charge the battery 50 by a constant voltage.

Note that the charger circuit of the present invention may omit the aforementioned switching conversion circuit 60 and achieve all the aforementioned charging phases by the capacitive power conversion circuit, which will be described later.

FIG. 4 shows one embodiment of the charger circuit according to the present invention (charger circuit 4). As shown in the figure, the charger circuit 4 further includes a linear regulation switch circuit 33 which includes a regulation switch SWG coupled to the conversion switch circuit 31. The linear regulation switch circuit 33 is configured to operably convert the converted output power to the charging power, wherein an input terminal and an output terminal of the regulation switch SWG are electrically connected to the converted output power and the charging power respectively. In this embodiment, the conversion control circuit 32 further generates a regulation switch control signal CTRS for controlling the regulation switch SWG.

Still referring to FIG. 4, in one embodiment, in the current scale-up charging mode, the regulation switch control signal CTRS controls the regulation switch SWG to be conductive, whereby the converted output current ICV becomes the charging current ICHG.

In this embodiment, the operation modes may further include a constant voltage linear charging mode (corresponding to the aforementioned constant voltage charging phase) and a constant current linear charging mode (corresponding to the aforementioned pre-charging phase). Still referring to FIG. 4, in the constant voltage linear charging mode, the regulation switch control signal CTRS of the charger circuit 4 linearly controls the regulation switch SWG according to the charging voltage VCHG to convert the aforementioned converted output power VCV to the charging voltage VCHG, such that the charging voltage VCHG is regulated at a predetermined constant voltage level. In one embodiment, in this mode, the conversion control signal CTRL conducts at least one of the plural conversion switches, to conduct the DC voltage VDC to generate the converted output voltage VCV. Besides, in the constant current linear charging mode, the regulation switch control signal CTRS of the charger circuit 4 linearly controls the regulation switch SWG to convert the aforementioned converted output power VCV to the charging current ICHG, such that the charging current ICHG is regulated at a predetermined constant current level. In one embodiment, in this mode, the conversion control signal CTRL conducts at least one of the plural conversion switches, to conduct the DC voltage VDC to generate the converted output voltage VCV.

Still referring to FIG. 4, in one embodiment, the charger circuit of the present invention further comprises a cable 20 and/or a connector for coupling the power delivery unit 10 with the capacitive power conversion circuit (for example the capacitive power conversion circuit 30), wherein the cable 20 and/or connector is a USB or USB PD (Universal Serial Bus Power Delivery) specification compliant cable and/or connector which includes a power line 21 for transmitting the DC output power and a signal line 22 for transmitting the charging voltage related signal. Note that the cable 20 or the connector may be omitted in other embodiments.

Still referring to FIG. 4, in one embodiment, in the constant voltage linear charging mode or the constant current linear charging mode, the power delivery unit 10 determines the DC voltage according to a charging voltage related signal, such that the DC voltage level is close to but larger than the charging voltage VCHG, whereby a voltage difference between the input terminal and the output terminal of the regulation switch SWG is smaller than a predetermined dropout voltage. The conversion efficiency in the constant voltage linear charging mode or the constant current linear charging mode can hence be improved. In one preferred embodiment, the conversion control circuit 32 may transmit the charging voltage related signal to the power delivery unit 10 by the aforementioned signal line 22 to determine the DC voltage level.

Still referring to FIG. 4, in one embodiment, the conversion control circuit 32 senses the DC current IDC to generate a current related signal (for example the ISEN as shown in the figure), and the power delivery unit 10 regulates the DC current IDC to be at the aforementioned predetermined DC current level according to the current related signal ISEN. In one preferred embodiment, the conversion control circuit 32 may transmit the current related signal to the power delivery unit 10 by the signal line 22.

Note that the aforementioned capacitive power conversion circuit (such as the capacitive power conversion circuit 30, 30') performs power conversion by capacitive power conversion and/or linear regulation to charge the battery in all the charging phases, and it does not need any inductor as in a switching power conversion circuit; therefore, the cost and size can be reduced.

Figure 5:
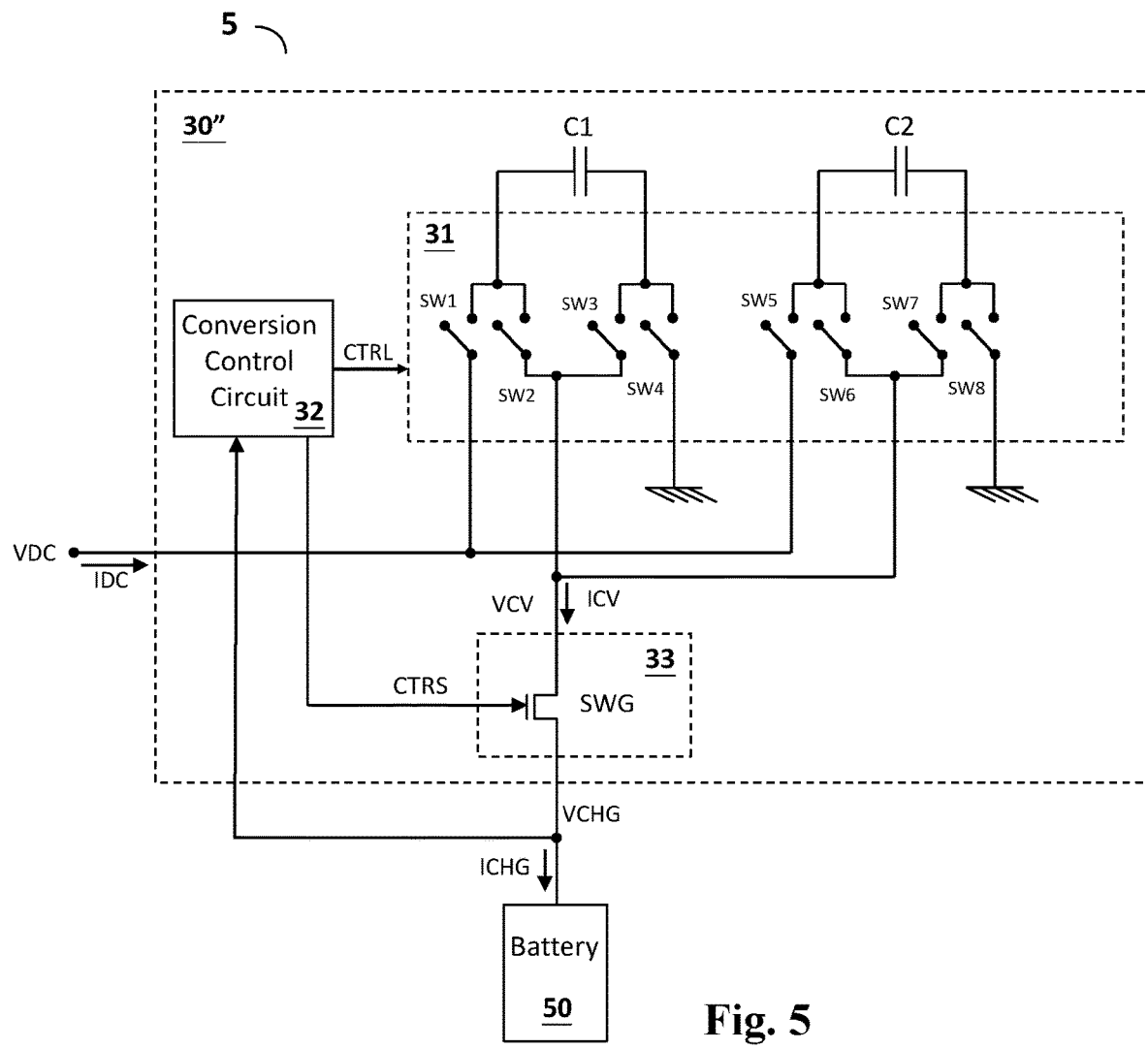
FIG. 5 shows a schematic diagram of a specific embodiment of the charger circuit according to the present invention.

FIG. 5 shows one embodiment of the capacitive power conversion circuit of the charger circuit according to the present invention (capacitive power conversion circuit 30"). As shown in the figure, in this embodiment, the conversion capacitors include a first and a second conversion capacitors C1 and C2, and the plural charging conversion time periods includes a first and a second charging conversion time periods. In the current scale-up charging mode, the conversion control circuit 32 operates the conversion switches (for example the conversion switch SW1-SW8 as shown in the figure) so as to electrically connect a first node of the first conversion capacitor C1 to the DC voltage VDC and the converted output voltage VCV during the first and the second charging conversion time periods respectively, and electrically connect a second node of the first conversion capacitor C1 to the converted output voltage VCV and the ground node during the first and the second charging conversion time periods respectively, and electrically connect a first node of the second conversion capacitor C2 to the DC voltage VDC and the converted output voltage VCV during the second and the first charging conversion time periods respectively, and electrically connect a second node of the second conversion capacitor C2 to the converted output voltage VCV and the ground node during the second and the first charging conversion time periods respectively, such that the charging current ICHG is substantially 2 times the DC current IDC. Note that in this embodiment, the connections of the conversion capacitors C1 and C2 are reversely switched among the aforementioned nodes. In one embodiment, in the current scale-up charging mode, the regulation switch SWG is controlled to be conductive to electrically connect the converted output power and the charging power.

Figure 6:
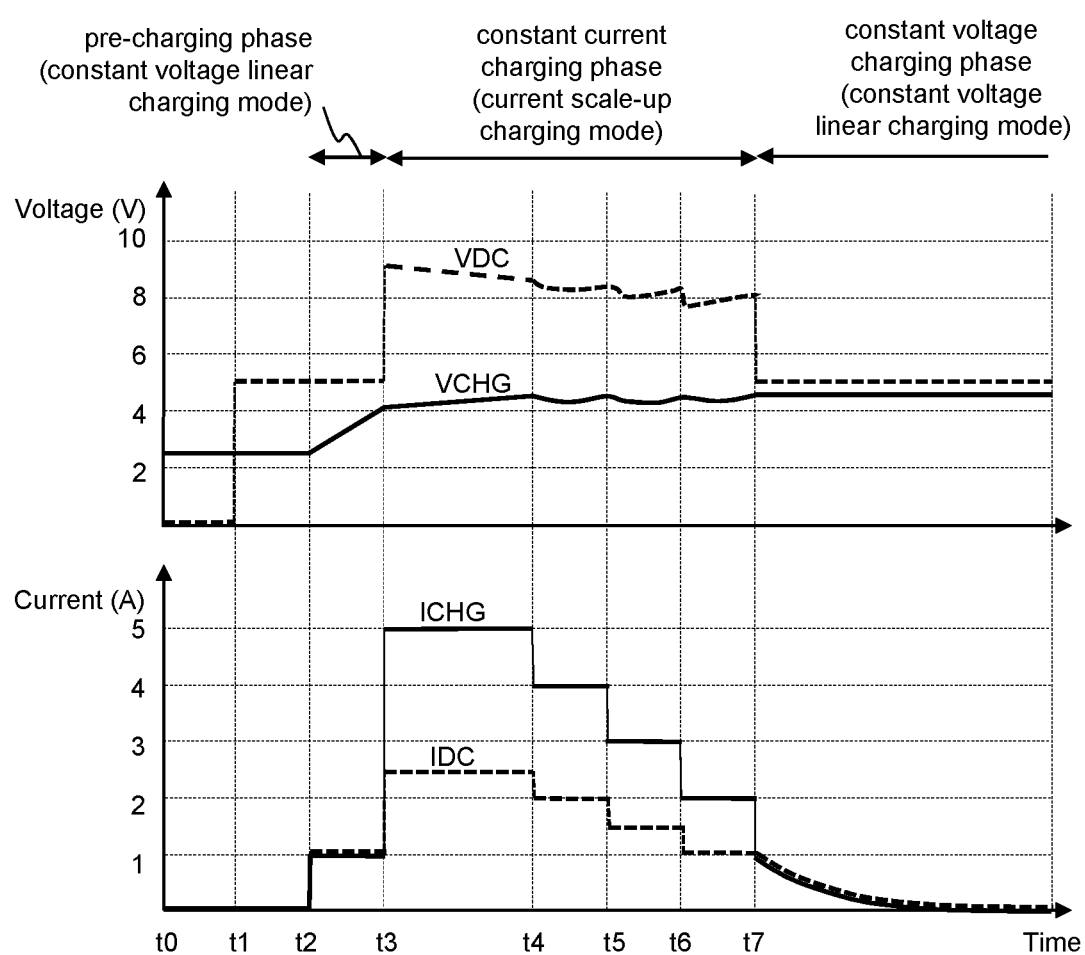
FIG. 6 shows schematic waveforms corresponding to the charger circuit of FIG. 5 according to the present invention.

FIG. 6 shows schematic waveforms corresponding to the charger circuit 5 as shown in FIG. 5, which shows a complete charging process of a battery (for example the aforementioned battery 50). Referring to FIGS. 5 and 6, in the pre-charging phase between t2 and t3, the charger circuit 5 of the present invention performs the aforementioned constant current linear charging. As shown in FIG. 6, the DC voltage VDC is regulated at 5V, and the regulation switch SWG in FIG. 5 converts the DC voltage VDC to the charging current ICHG which is regulated to be a constant current of around 1 A to charge the battery, wherein the DC current IDC is substantially the same as the charging current ICHG in this phase.

Still referring to FIG. 6, in the constant current charging phase from t3 to t7, the charger circuit 5 charges the battery by the aforementioned current scale-up charging mode (i.e. charging with a scaled-up current by the capacitive power conversion circuit). As shown in the figure, in this embodiment, the power delivery unit 10 regulates the DC current IDC to several different constant current levels (for example corresponding to 2.5 A, 2 A, 1.5 A and 1 A) in several different time slots (t3-t4-t5-t6-t7), and the charging current ICHG is scaled-up by the capacitive power conversion circuit 30" to correspondingly be 5 A, 4 A, 3 A, and 2 A as shown in the figure. The scaled-up charging current levels are substantially 2 times the DC current IDC respectively. In one embodiment, the constant current may be only one single level. As mentioned above, the charger circuit of the present invention can shorten the charging time by the capacitive power conversion circuit which provides a scale-up charging current to charge the battery, with a standard cable such as a USB compliant cable and no specially-designed fast charging cable is required. Besides, note that in this mode, the DC voltage VDC is substantially 2 times the charging voltage VCHG.

Still referring to FIG. 6, in the constant voltage charging phase after t7, the charger circuit 5 charges the battery 50 by the aforementioned constant voltage linear charging mode. As shown in the figure, in this embodiment, the power delivery unit 10 regulates the DC voltage VDC to be 5V. And the regulation switch SWG converts the DC voltage VDC to the charging voltage VCHG which is linearly regulated to a substantially constant voltage level 4.2V for charging the battery as shown in FIG. 5. Note that the current ICHG naturally decays with time and the DC current IDC is substantially the same as the charging current ICHG.

The present invention has been described in considerable detail with reference to certain preferred embodiments thereof. It should be understood that the description is for illustrative purpose, not for limiting the scope of the present invention. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. As an example, the "capacitive power conversion mode" and the "constant voltage linear charging mode" and the "constant current linear charging mode" can be used together. More specifically, for example, in the "constant voltage linear charging mode" or the "constant current linear charging mode", it can be arranged so that the plural conversion switches of the capacitive power conversion circuit are configured to operate in the "capacitive power conversion mode", and the converted output power is converted to the charging power by the regulation switch which is controlled to perform the "constant voltage linear charging" or the "constant current linear charging". Furthermore, those skilled in this art can readily conceive variations and modifications within the spirit of the present invention. For example, plural capacitive power conversion circuits according to the present invention can be used in parallel to reduce the equivalent resistance of the conversion circuit for increasing the conversion efficiency. As another example, the polarity of the conversion capacitor can be altered during different conversion periods, for example as positive in some conversion periods and negative in other conversion periods, to increase the range or resolution of the scale-up factor K. As another example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. The spirit of the present invention should cover all such and other modifications and variations, which should be interpreted to fall within the scope of the following claims and their equivalents.

What is claimed is:

1. A charger circuit, configured to operably convert a DC power to a charging power for charging a battery, wherein the DC power includes a DC voltage and a DC current, and the charging power includes a charging voltage and a charging current; the charger circuit comprising:
    a power delivery unit, configured to operably convert an input power to the DC power; and
    a capacitive power conversion circuit which includes:
        a conversion switch circuit including plural conversion switches coupled to one or more conversion capacitors, the conversion switch circuit being configured to operably convert the DC power to a converted output power, wherein the converted output power includes a converted output voltage and a converted output current;
        a linear regulation switch circuit including a regulation switch coupled to the conversion switch circuit, the linear regulation switch circuit being configured to operably convert the converted output power to the charging power, wherein an input terminal and an output terminal of the regulation switch are electrically connected to the converted output power and the charging power respectively; and
        a conversion control circuit, configured to operably generate a conversion switch control signal for controlling the plural conversion switches and a regulation switch control signal for controlling the regulation switch;
    wherein in a current scale-up charging mode, the power delivery unit regulates the DC current, and the conversion switch control signal operates the plural conversion switches so as to electrically connect the one or more conversion capacitors between a pair of nodes selected from one or more charging voltage division nodes, the DC output voltage, and a ground node periodically during plural charging conversion time periods, such that the charging current is scaled-up of the DC current substantially by a predetermined current scale-up factor, wherein the converted output power is electrically connected to one of the one or more charging voltage division nodes, and the regulation switch control signal conducts the regulation switch such that the converted output current becomes the charging current;
    in a constant voltage linear charging mode, the regulation switch control signal operates the regulation switch, such that the charging voltage is regulated at a predetermined constant voltage level; and
    in a constant current linear charging mode, the regulation switch control signal operates the regulation switch, such that the charging current is regulated at a predetermined constant current level.

2. The charger circuit of claim 1, wherein in the constant voltage linear charging mode or the constant current linear charging mode, the power delivery unit determines the DC voltage according to a charging voltage related signal, such that the DC voltage level is close to but larger than the charging voltage, whereby a voltage difference between the input terminal and the output terminal of the regulation switch is smaller than a predetermined dropout voltage.

3. The charger circuit of claim 1, further comprising a cable coupled between the power delivery unit and the capacitive power conversion circuit, wherein the cable is a USB or USB PD (Universal Serial Bus Power Delivery) specification compliant cable which includes a power line for transmitting the DC output power and a signal line for transmitting a charging voltage related signal.

4. The charger circuit of claim 1, wherein the conversion capacitors include a first conversion capacitor and a second conversion capacitor, and the plural charging conversion time periods includes a first charging conversion time period and a second charging conversion time period; wherein in the current scale-up charging mode, the conversion control circuit operates the conversion switches so as to electrically connect a first node of the first conversion capacitor to the DC voltage and the converted output voltage during the first charging conversion time period and the second charging conversion time period respectively, and electrically connect a second node of the first conversion capacitor to the converted output voltage and the ground node during the first charging conversion time period and the second charging conversion time period respectively, and electrically connect a first node of the second conversion capacitor to the DC voltage and the converted output voltage during the second charging conversion time period and the first charging conversion time period respectively, and electrically connect a second node of the second conversion capacitor to the converted output voltage and the ground node during the second charging conversion time period and the first charging conversion time period respectively, such that the charging current is substantially 2 times the DC current.

5. A capacitive power conversion circuit for use in a charger circuit which is configured to operably convert a DC power to a charging power for charging a battery, wherein the DC power includes a DC voltage and a DC current, and the charging power includes a charging voltage and a charging current; wherein the charger circuit includes a power delivery unit configured to operably convert an input power to the DC power; the capacitive power conversion circuit comprising:

a conversion switch circuit including plural conversion switches coupled to one or more conversion capacitors, the conversion switch circuit being configured to operably convert the DC power to a converted output power, wherein the converted output power includes a converted output voltage and a converted output current;

a linear regulation switch circuit including a regulation switch coupled to the conversion switch circuit, the linear regulation switch circuit being configured to operably convert the converted output power to the charging power, wherein an input terminal and an output terminal of the regulation switch are electrically connected to the converted output power and the charging power respectively; and a conversion control circuit, configured to operably generate a conversion switch control signal for controlling the plural conversion switches and a regulation switch control signal for controlling the regulation switch;

wherein in a current scale-up charging mode, the power delivery unit regulates the DC current, and the conversion switch control signal operates the plural conversion switches so as to electrically connect the one or more conversion capacitors between a pair of nodes selected from one or more charging voltage division nodes, the DC output voltage, and a ground node periodically during plural charging conversion time periods, such that the charging current is scaled-up of the DC current substantially by a predetermined current scale-up factor, wherein the converted output power is electrically connected to one of the one or more charging voltage division nodes, the regulation switch control signal controls the regulation switch to be conductive for conducting the converted output current to be the charging current;

in a constant voltage linear charging mode, the regulation switch control signal operates the regulation switch, such that the charging voltage is regulated at a predetermined constant voltage level; and in a constant current linear charging mode, the regulation switch control signal operates the regulation switch, such that the charging current is regulated at a predetermined constant current level.

6. The capacitive power conversion circuit of claim 5, wherein in the constant voltage linear charging mode or the constant current linear charging mode, the power delivery unit determines the DC voltage according to a charging voltage related signal, such that the DC voltage level is close to but larger than the charging voltage, whereby a voltage difference between the input terminal and the output terminal of the regulation switch is smaller than a predetermined dropout voltage.

7. The capacitive power conversion circuit of claim 5, further comprising a cable coupled between the power delivery unit and the capacitive power conversion circuit, wherein the cable is a USB or USB PD (Universal Serial Bus Power Delivery) specification compliant cable which includes a power line for transmitting the DC output power and a signal line for transmitting a charging voltage related signal.

8. The capacitive power conversion circuit of claim 5, wherein the conversion capacitors include a first conversion capacitor and a second conversion capacitor, and the plural charging conversion time periods includes a first charging conversion time period and a second charging conversion time period; wherein in the current scale-up charging mode, the conversion control circuit operates the conversion switches so as to electrically connect a first node of the first conversion capacitor to the DC voltage and the converted output voltage during the first charging conversion time period and the second charging conversion time period respectively, and electrically connect a second node of the first conversion capacitor to the converted output voltage and the ground node during the first charging conversion time period and the second charging conversion time period respectively, and electrically connect a first node of the second conversion capacitor to the DC voltage and the converted output voltage during the second charging conversion time period and the first charging conversion time period respectively, and electrically connect a second node of the second conversion capacitor to the converted output voltage and the ground node during the second charging conversion time period and the first charging conversion time period respectively, such that the charging current is substantially 2 times the DC current.

9. A charging control method for use in a charger circuit which is configured to operably convert a DC power to a charging power for charging a battery, wherein the DC power includes a DC voltage and a DC current, and the charging power includes a charging voltage and a charging current; wherein the charger circuit comprises: a power delivery unit, configured to convert an input power to the DC power; and a capacitive power conversion circuit which includes: a conversion switch circuit including plural conversion switches coupled to one or more conversion capacitors, the conversion switch circuit being configured to operably convert the DC power to a converted output power, wherein the converted output power includes a converted output voltage and a converted output current; and a linear regulation switch circuit including a regulation switch coupled to the conversion switch circuit, the linear regulation switch circuit being configured to operably convert the converted output power to the charging power, wherein an input terminal and an output terminal of the regulation switch are electrically connected to the converted output power and the charging power respectively; the charging control method comprising:

operating the charger circuit in a current scale-up charging mode, a constant voltage linear charging mode, and a constant current linear charging mode, wherein:

in the current scale-up charging mode:
regulating the DC current;
during plural charging conversion time periods, operating the plural conversion switches so as to electrically connect the one or more conversion capacitors between a pair of nodes selected from one or more charging voltage division nodes, the DC output voltage, and a ground node periodically such that the charging current is scaled-up of the DC current substantially by a predetermined current scale-up factor, wherein the converted output power is electrically connected to one of the one or more charging voltage division nodes; and conducting the regulation switch such that the converted output current becomes the charging current;

in the constant voltage linear charging mode:

operating the regulation switch, such that the charging voltage is regulated at a predetermined constant voltage level; and in the constant current linear charging mode:

operating the regulation switch, such that the charging current is regulated at a predetermined constant current level.

10. The charging control method of claim 9, further comprising:

in the constant voltage linear charging mode or the constant current linear charging mode:

adjusting the DC voltage by the power delivery unit according to a charging voltage related signal such that the DC voltage level is close to but larger than the charging voltage, whereby a voltage difference between the input terminal and the output terminal of the regulation switch is smaller than a predetermined dropout voltage.

* * * * *